C. E. VAN AUKEN.
DUPLEX OSCILLATING SAW.
APPLICATION FILED MAY 7, 1917.

1,274,820.

Patented Aug. 6, 1918.
4 SHEETS—SHEET 2.

Witness:
William E. Lawton

Inventor:
Clarence E. Van Auken
by
Banning & Banning
Attys.

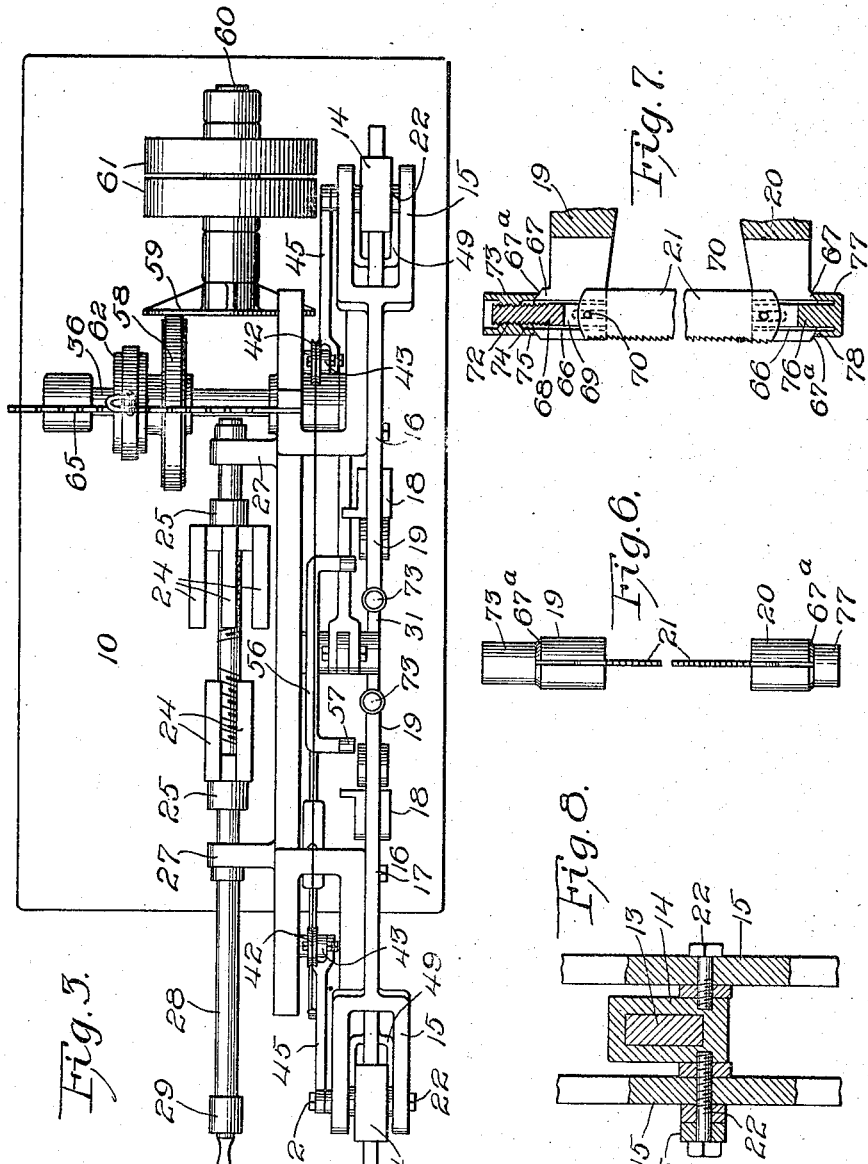

C. E. VAN AUKEN.
DUPLEX OSCILLATING SAW.
APPLICATION FILED MAY 7, 1917.
1,274,820.
Patented Aug. 6, 1918.
4 SHEETS—SHEET 4.
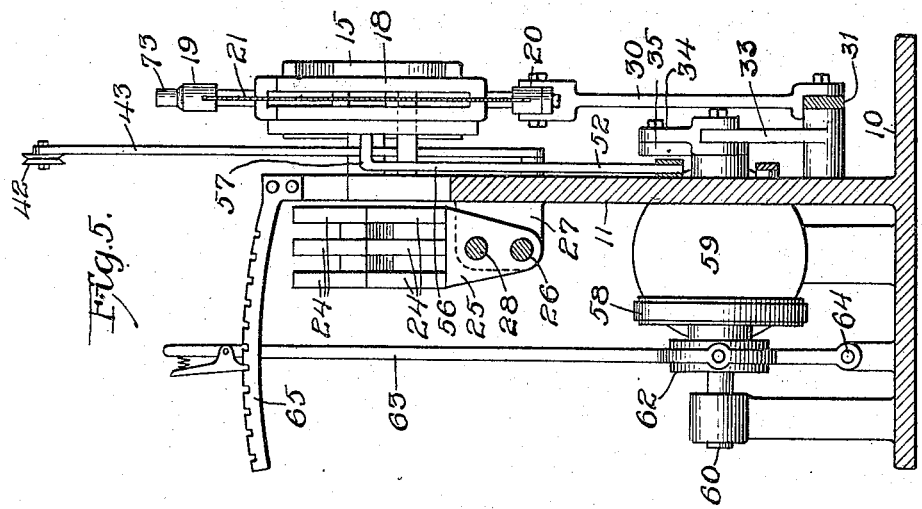
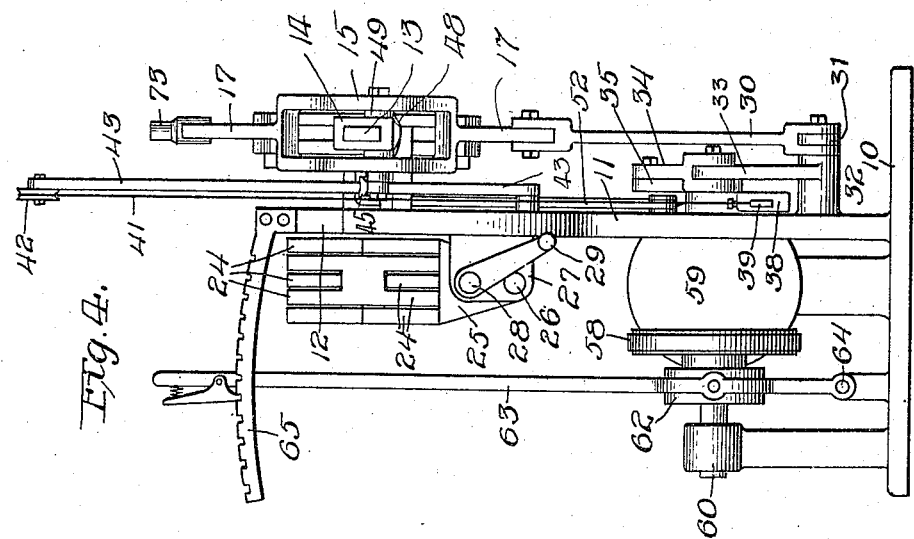
Witness:
William E. Lawton
Inventor:
Clarence E. Van Auken
by Banning & Banning
Attys.

UNITED STATES PATENT OFFICE.

CLARENCE E. VAN AUKEN, OF CHICAGO, ILLINOIS, ASSIGNOR TO CORA F. VAN AUKEN, OF CHICAGO, ILLINOIS.

DUPLEX OSCILLATING SAW.

1,274,820.      Specification of Letters Patent.     Patented Aug. 6, 1918.

Application filed May 7, 1917. Serial No. 167,098.

*To all whom it may concern:*

Be it known that I, CLARENCE E. VAN AUKEN, a citizen of the United States, residing at Chicago, in the county of Cook and State of Illinois, have invented certain new and useful Improvements in Duplex Oscillating Saws, of which the following is a specification.

The saw of the present invention is designed primarily for use in the sawing of iron or steel shafts, bars or the like, which are frequently of cylindrical formation; and the primary object of the invention is to so construct, mount and arrange the saws that the cutting speed can be greatly increased as compared with saws of the usual type employed for a similar purpose.

The saws employed in the present invention are mounted in such a manner as to oscillate in alternation to one another, with the result that the cutting line will be in the arc of a circle, which serves to bring different portions of the cutting edge of the saw progressively into contact with the work as the saw travels downwardly during its active stroke, so that at no time will an excessive load be thrown on the saw, which is frequently the case where reciprocating saws are employed. In the use of the latter, as the saws approach the center of a cylindrical shaft or the like, a progressively increasing length of the cutting edge will be presented to the work, with the result that the load will increase progressively from the surface toward the center, which is highly objectionable in that, as the center is approached, the load will increase to a point where the teeth are unable to effectively bite into the metal but merely scrape or scratch the surface so that the cutting speed is greatly reduced.

The present invention is so designed as to substantially equalize and distribute the load on the saws, with the result that the cutting speed at the center of the work will not be materially reduced as compared with the cutting speed at the outer surface.

The invention further relates to the means which are provided for enabling the duplex saws to approach each other and finally sever the work at or near the center without interference of the saws with one another; to the means employed for causing the saws to operate in alternation; to the means provided for affording a release and clearance to each of the saw blades on its inactive or return movement; to the means for progressively advancing the companion saws toward the center; and to the means for clamping and holding the saws in the oscillating frames which carry them.

The invention also pertains to the construction of the vise or work holder which serves to properly center the work irrespective of its size and shape; to the means for maintaining the companion saws in the same plane as they approach one another; to the means for preventing the jamming of the saw blades on the beginning of the return strokes; and to the means for varying the speed of the machine to accommodate it to the size, shape and hardness of the material being cut.

The invention consists further in the features of construction and combination of parts hereinafter described and claimed.

In the drawings:

Fig. 3 is a top or plan view of the machine;

Fig. 4 is an end elevation of the same;

Fig. 5 is a cross sectional elevation taken through the center of the machine;

Figs. 6 and 7 are enlarged sectional details of one of the saws and the oscillating frame within which it is mounted;

Fig. 8 is a detail in section of the bifurcated head of the oscillating yoke and the associated parts; and Fig. 9 is a section of Fig. 7, showing the upper clamping head.

Figure 1:
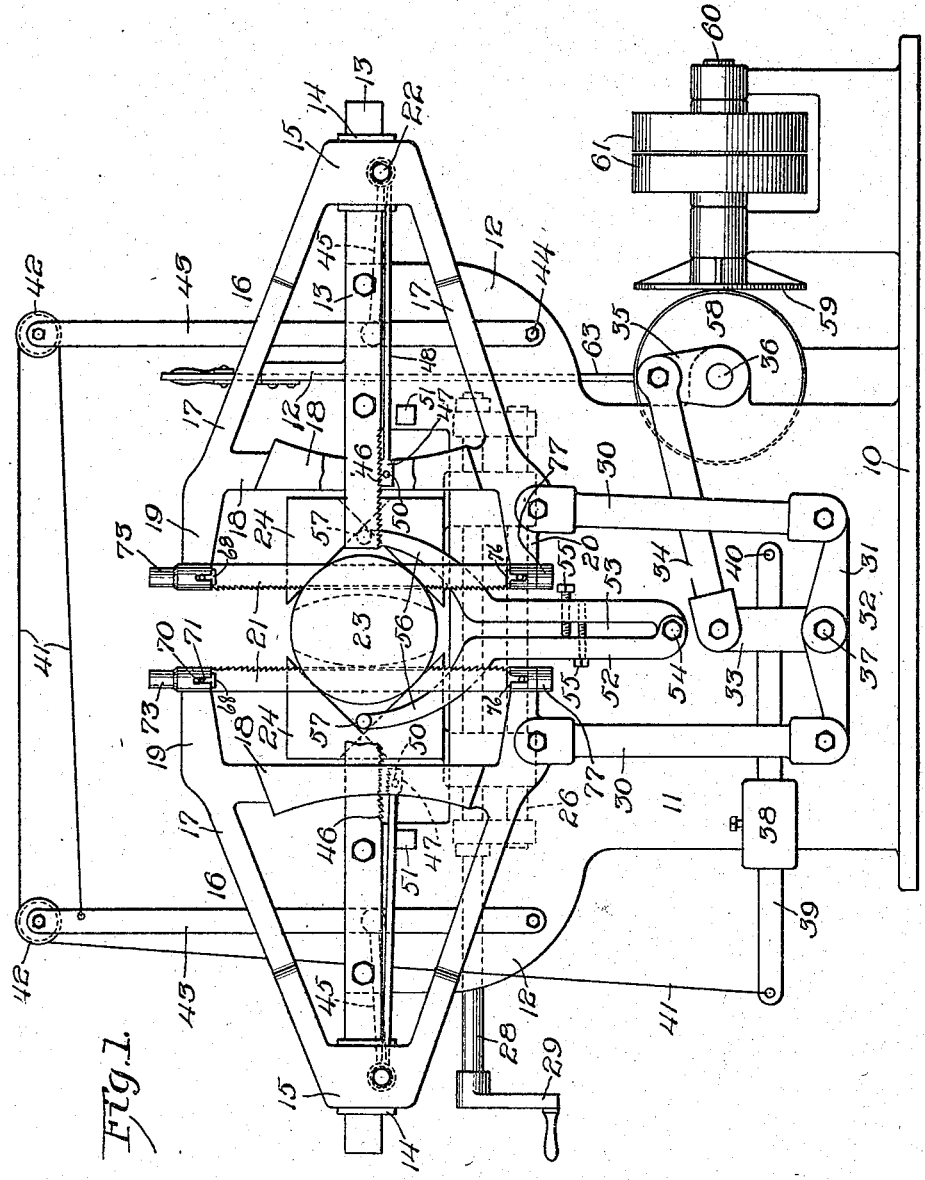
Figure 1 is a front elevation of the machine with the saws in intermediate or normal position.

The machine as a whole is mounted upon a base plate 10, at one end of which is located a main frame 11 provided at each end with an upstanding arm 12. Since the main operating parts of the present invention are arranged in duplicate, it will be understood that the description now to be given applies equally to both sides of the machine, which is symmetrically arranged with respect to the center position where the work is located.

Each of the arms 12 serves as a mounting for a longitudinally extending guide bar 13, the companion bars being arranged end to end in exact alinement, which is essential in order that the saw frames which are mounted upon the respective guide bars may advance toward one another in the same plane so that the cutting action will proceed from opposite sides toward a common center.

Each of the bars 13 is of rectangular shape in cross section and serves as a mounting for a rider block 14, which is slidably mounted upon the bar and is adapted to travel inwardly as the sawing operation advances. The rider block serves as a mounting for the bifurcated head 15 of the oscillating yoke frame 16, which comprises upper and lower inwardly diverging arms 17 which merge into the head 15, and a slotted vertically arranged cross bar 18.

The upper and lower arms 17 are inwardly extended to afford upper and lower clamping heads 19 and 20 which are suitably spaced to accommodate a hack saw blade 21 having downwardly projecting teeth, the blades being active on the downward stroke only. The means employed for clamping and holding the blades between the clamping heads 19 and 20 constitute a special feature of the invention, which will be presently described in detail.

The yoke head 15 of the oscillating yoke frame is pivotally mounted upon cross pins 22, which are carried by the rider block 14 and are located a little below the center line thereof so that the yoke frame with its saw blade will oscillate from a point a little below the vertical center of the cutting line, which is desirable in order that the saw blade will release from the work without cramping or jamming on its return or inactive stroke, as will more perfectly appear from subsequent description.

As shown in the drawings, the work 23, which is in the form of a cylindrical section of steel shafting, is firmly held or clamped in the exact center of the machine by means of a vise, which comprises cooperating notched clamping jaws provided with plates 24, which engage the work on opposite sides thereof, as shown in Fig. 1. The notched clamping plates 24 composing each jaw are grouped in series on opposite sides of the work, as shown in Fig. 3, the plates composing one of the jaws being in staggered relation with the plates composing the companion jaw, so that where work of small cross diameter is held, the clamping plates on opposite sides can be brought together in intermeshing relation and thereby afford an effective clamping arrangement irrespective of the size and shape of the work being held, which will always be clamped and positioned in the exact center of the machine. This will be evident in view of the fact that the interior angles of the notches in the respective clamping plates are located in the center position.

The clamping plates of each jaw are united at the base to a depending head 25, which is mounted to travel toward and from the center along a guide rod 26 mounted at its ends in lugs 27 which outwardly project from the rear side of the main frame, as best shown in Fig. 3. In order to provide for the in and out adjustment of the jaws, a right and left screw adjusting rod 28 is employed which is journaled in the lugs 27 and extends above and in parallel relation with the guide rod 26, which adjusting rod is threaded through the jaw heads and is provided on its end with a handle 29. By rotating the handle, the jaw heads will be moved toward and from one another in unison, and the clamping plates composing the respective jaws will be adjusted to firmly grip the work and center it to the intended position.

Although the vise has been described with considerable detail, it is obvious that other forms of clamping mechanism might be successfully employed, and it is not intended to limit the invention to the particular clamping mechanism shown and described.

Each of the oscillating yoke frames is operated through the medium of a link 30, which is pivoted at its upper end at or near the inner end of the lower yoke arm 17, and is pivoted at its lower end to one of the arms 31 of a rocker bar 32, which as shown is of inverted T shape and is provided with a middle arm 33, which in turn is pivoted to a pitman 34 carried by a crank 35 on a power shaft 36. The rocker bar is mounted upon a center pivot 37, so that as the crank 35 is rotated the pitman 34 will serve to impart a rocking motion to the rocker bar, which will impart alternate up and down movements to the respective oscillating yoke frames with the saws carried thereby.

The respective yoke frames are moved inwardly to the work as the cutting advances, by means of a weight 38 mounted upon a lever 39, which is pivoted at its inner end to a pivot 40 carried by the main frame, the weight being slidable along the lever 39 in order to regulate the tension imparted to a cable 41 which is carried over a pair of pulleys 42. The pulleys are respectively mounted at the upper ends of a pair of upstanding levers 43, one for each of the oscillating yokes, each of the levers at its lower end being carried by a pivot 44 supported from the main frame.

The cable 41, passing around both pulleys 42, is secured to the upstanding lever 43 which carries the first pulley, so that the tension caused by the weight 38 will react equally on both of the upstanding levers and tend to draw their upper ends equally toward the center. In order to impart this movement to the respective oscillating yoke frames, each of the frames is provided with a link 45 which is pivoted at its outer end to the frame and at its inner end to the adjacent upstanding bar, so that an inward movement of the latter will cause the oscillating yoke frame to travel inwardly along the guide bar 13, thereby carrying the saw inwardly as the cutting progresses.

While it is desirable to apply pressure to the saw during its downward or cutting stroke in order to cause the saw teeth to bite into the work, it is equally desirable to release the blade from pressure on its up or return stroke and afford a clearance between the teeth and the work during this return movement. In order to accomplish this result, the following mechanism is provided.

Each of the guide bars 13, at its inner end and on its under edge, is provided with outwardly facing ratchet teeth 46. The teeth on each guide bar coöperate with a dog 47 carried at the inner end of an arm 48, the outer end 49 of which is bifurcated and mounted upon the pivot 22 which carries the bifurcated head of the coöperating oscillating yoke frame. The dog is operable within the slot in the cross bar 18 of the oscillating yoke, through which slot the guide rod also extends.

The side faces of the dog 47 are provided with small friction disks 50 which bear against the machined inner faces of the slot, so that the dog can move within the slot against the friction of the disks 50. The movement of the dog in a downward direction, however, is limited by means of a stop 51 inwardly projecting from the upstanding arm 12 of the main frame, and its movement in the upper direction is limited by its engagement with the ratchet teeth of the guide bar 13. On the down stroke of the oscillating yoke frame, as indicated to the left of Fig. 1, the friction of the disks against the milled inner faces of the slotted cross connecting bar 18 will cause the dog to release from the ratchet teeth and move downwardly until its movement is arrested by the stop, after which slight movement the slotted cross arm will continue to slip past the friction disks until the oscillating yoke frame has completed its downward or cutting movement, at which time the friction disks will lie against the upper end of the slot.

Immediately upon the beginning of the up stroke of the oscillating yoke frame, the dog will be carried up into engagement with the ratchet teeth on the fixed guide bar 13, so that on the up stroke of the saw the oscillating yoke will be held against inward movement due to the tension exerted by the weight. Since the yoke swings on a center which is slightly below the longitudinal center of the work itself, it is evident that the teeth of the saw on the up stroke will swing clear of contact with the previously formed cut in the work, so that there will be no binding or cramping of the saw during its return movement. The ratchet teeth are spaced sufficiently close together to accommodate the progressive advancements of the oscillating frame as the saw eats into the work, and on the downward stroke of each saw the entire pull of the weight will be utilized to afford the necessary cutting pressure.

As the cutting progresses, the companion saws will advance inwardly toward one another, and in view of the fact that the cut formed in the work is of arcuate form, and that the uncut stock is progressively decreasing in width, it is evident that provision must be made for finally cutting through the work without bringing the saws into actual contact with one another. This function is performed by means of a floating spacer yoke 52, which is of substantially Y-formation and is provided with a split stem 53 pivoted at its lower end to a pivot 54 mounted on the main frame.

In order to regulate the width of the split in the stem 53, a pair of adjusting screws 55 are provided. Each of the component sections of the split stem terminates in an outwardly bent arm 56, at the upper end of which is mounted a stop roller 57, each of which rollers coöperates with the straight inner edge of the adjacent cross connecting bar 18 of the oscillating yoke, so that, after the yokes have traveled inwardly to a position which will bring the teeth of the respective saws closely adjacent to one another, the stop rollers carried by the floating yoke will be contacted by the respective cross connecting bars, and thereafter a further approach of the saw teeth toward one another will be prevented. In view of the fact, however, that the spacer yoke floats on the pivot 54, it is evident that each of the saws, on its active or down stroke, will, under the tension exerted by the weight 38, tend to advance and force back the inactive component saw through the intervention of the rollers carried by the floating spacer yoke, so that the active saw, on its final stroke, will pass the center point in the work and complete the cut without coming into contact with the return teeth of the component saw.

In order to regulate the speed of movement of the saw as a whole, the power shaft 36 has mounted thereon a driven friction clutch wheel 58, the edge of which contacts with the face of a driving friction clutch disk 59 mounted upon a shaft 60 carrying fast and loose pulleys 61. The friction wheel 58 is carried by a grooved collar 62, which coöperates with a lever 63 pivoted at its lower end at 64 and movable to different positions of adjustment along a notched rack 65. By moving the lever, the driven friction clutch wheel can be adjusted to the desired position with respect to the center of the driving clutch disk, and the speed of operation increased or diminished to the desired degree.

The saw blades employed in the machine of the present invention are made of relatively thin tempered steel, and in order to prevent the saws from bending or buckling, and to hold them in exact parallelism with one another, it is necessary to exert a longitudinal tension on the saw blades and to clamp them against torsional movement; and in order to accomplish this result the adjusting mechanism shown in Figs. 6 and 7 is employed.

The upper and lower clamping heads 19 and 20 of each of the oscillating yoke frames are slotted back to a considerable distance in order to afford space for the insertion of the upper and lower ends of the saw blade. Each of the heads being thus slotted is provided with a vertical bore 66, the upper end of which terminates in a boss 67 which is provided around the margin of the bore with a beveled face 67$^a$. The upper bore 66 has entered therethrough a bolt stem 68, which is provided at its lower or engaging end with a slot 69 which receives the upper end of a saw blade, the latter being connected with the bolt stem by means of a cross pin 70, the ends of which work through vertical slots 71 in the sides of the clamping head. The upper end of the bolt stem is provided with threads 72 which receive a nut 73, the lower end of which is cored out at the point 74 to clear the threads, and the nut at its lower end is inwardly beveled around its lower lip 75 to engage with the beveled surface 67$^a$ on the boss.

The upper adjusting bolt stem 68 coöperates with a lower stem 76, which is connected at its inner end to the lower end of the saw, and is provided at its outer end with an overhanging cap 77, the edge 78 of which is beveled to engage the beveled surface of the lower boss. By adjusting the nut 73 at the upper end of the saw, the upper and lower stems will exert a clamping pressure on the beveled surfaces of the respective bosses, so that the slotted ends of the upper and lower clamping heads will be squeezed or clamped together against the sides of the saw blade as tension is exerted thereon, with the result that the saw blade will be held under longitudinal tension and rigidly clamped against side movement or torsion, without the necessity for further adjustment.

In operation, after the material to be sawed, as, for instance, a cylindrical section of shaft, has been clamped and centered in the vise, the saws, under the tension exerted by the weight, will move into contact with the work. Thereafter, when the clutch wheel is moved to the desired position, the power can be applied and the cutting will begin. As the right hand saw moves down, its teeth will come successively into contact with the surface of the work and an arcuate cut will be effected, which in a measure tends to follow the curvature of the surface of the work.

By reason of the fact that the saw moves on a center which is slightly below the center of the work, it is evident that the teeth at the upper end of the saw will swing on a slightly longer radius than the teeth at the lower end, so that, at the beginning of the return movement, the intermediate and lower teeth will swing back free from contact with the preceding cut, which eliminates any binding or cramping of the saw blades. As soon as the return stroke begins, the dog 47 will be frictionally lifted to engagement with the overlying rack, and thereafter all of the tension derived from the weight will be thrown on the left hand saw as it begins its downward cutting movement. This alternate action of the two saws will continue step by step until the cuts progress inwardly to a point where the stop rollers on the floating spacer yoke are contacted, after which the inward thrust of the active saw will move back the companion saw to a corresponding degree, so that one of the saws will finally progress to a point where its thrust carries it beyond the center line and severs the work.

Figure 2:
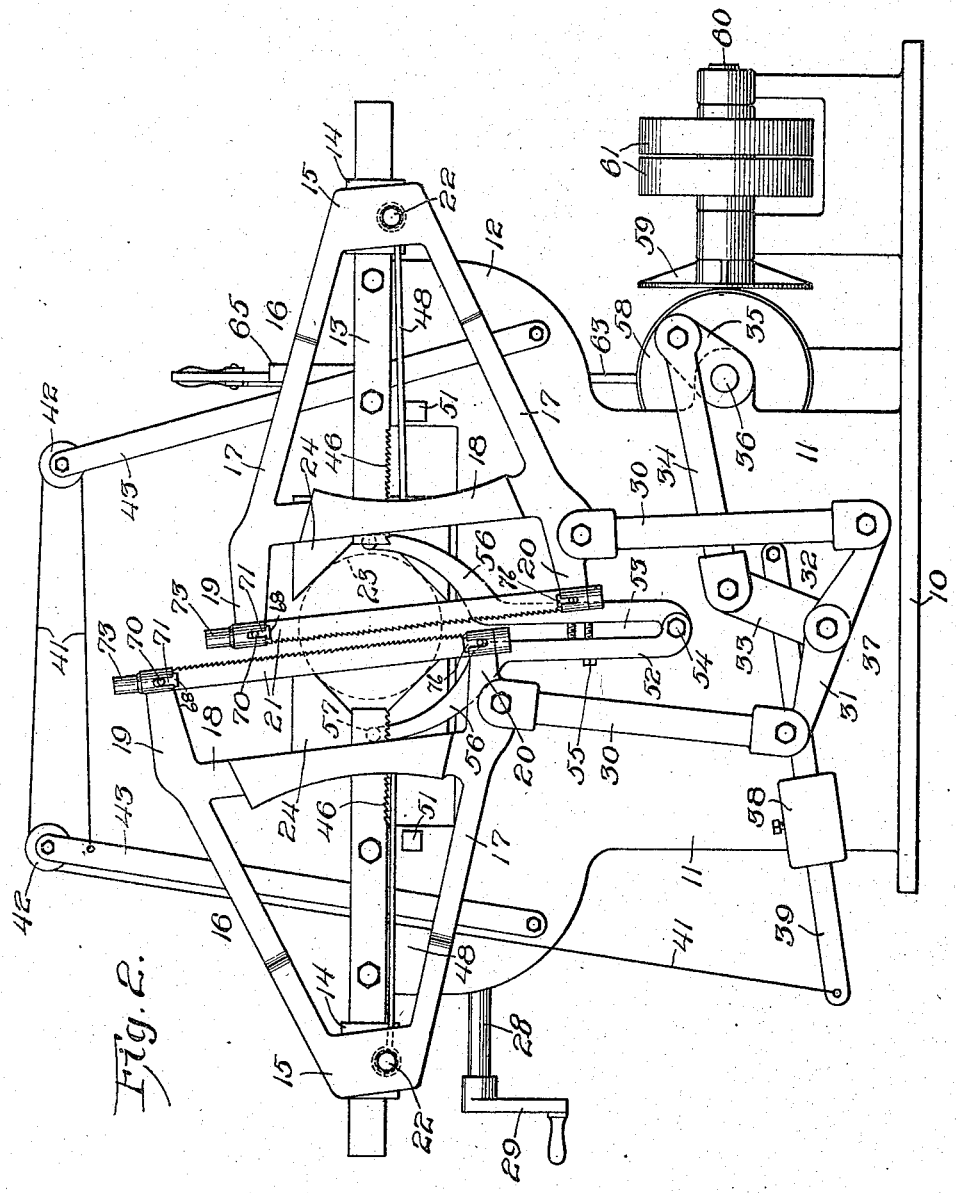
Fig. 2 is a similar view showing the saws at the extreme ends of their respective strokes and with their edges in close approach to one another.

In this ultimate cutting operation, the straight edge formation of the yoke cross bars 18 is important. These edges ride on the stop rollers, and when the saws are in the diagonal up and down position shown in Fig. 2, the edges of the cross bars 18, and the saws as well, will approach each other more closely than would be the case if the oscillating yokes were both moved on the same centers to the intermediate or medial positions. Since, however, the active occillating frame only is being forced inwardly by the weight, while the inactive or returning frame is held against inward movement, the former frame will advance to maintain the contact of the floating stop rollers, thereby forcing the active downwardly moving saw past the center line. A slight departure from the straight line formation, however, will not materially affect the result stated, provided that the edges be not cut on an arc with a center coincident with the center of movement.

The oscillating yoke frames are centered on the respective fixed guide bars 13, which bars are rigidly held in exact alinement with one another, so that the cutting will progress from opposite sides in a true plane, which is, of course, highly essential in order that a clean cut may be registered.

The saw of the present invention is designed primarily for high speed accurate work. By working the saws in duplicate, the cutting speed is, of course, substantially doubled, but in addition to this the arrangement is one which may be speeded up to a much higher degree than is possible in the use of reciprocating saws, whether operating singly or in duplex arrangement. This capacity for speed is due primarily to the fact that the cutting proceeds in an arcuate line, so that a much longer line of cutting contact is maintained with the work, even at the beginning of the cut, than is possible where a straight line reciprocating movement is relied upon. At the same time but a small section of the toothed cutting edge of the saw is presented to the cut at any one time. The cutting contact is progressively shifted from end to end of the saw blade during each cutting movement, with the result that each saw tooth is but momentarily presented to the cut during each reciprocation. This greatly reduces the wear to which the teeth are subjected, so that the saw blades will maintain themselves in sharp and serviceable condition for a much longer time than is the case where a large number of teeth are simultaneously brought into cutting contact with the work.

The present arrangement also tends to eliminate useless friction and to center all of the pressure afforded by the weight upon the several teeth actually in cutting contact for the time being, so that the cutting action is extremely efficient, rapid and accurate.

I claim:

1. In a saw of the class described, an oscillating frame, a saw blade carried by the frame, means for holding the work in position to be acted upon by the saw blade, a guide for the oscillating frame, means for exerting a pressure to advance the oscillating frame along the guide during its cutting stroke, and means for locking the oscillating frame against advancement due to such pressure during its return stroke, substantially as described.

2. In a saw of the class described, the combination of an oscillating frame, a saw blade carried by the oscillating frame, a guide bar, a rider on the guide bar, a pivot for mounting the oscillating frame on the rider at a point slightly to one side of the cutting center of the saw blade, means for exerting a pressure tending to advance the rider during the active movement of the saw blade, and means adapted on the return movement of the saw blade to lock the rider against advancement due to pressure, substantially as described.

3. In a saw of the class described, the combination of an oscillating frame, a saw blade carried by the oscillating frame, a guide bar, a rider on the guide bar, a pivot for mounting the oscillating frame on the rider at a point slightly to one side of the cutting center of the saw blade, means for exerting a pressure tending to advance the rider during the active movement of the saw blade, an element provided with ratchet teeth, a dog mounted to engage said ratchet teeth on the inactive movement of the blade and to disengage from said teeth on the active movement of the saw blade, and a connection between the dog and the rider for holding the latter against advancement under pressure when the dog is in engagement with the ratchet teeth, substantially as described.

4. In a saw of the class described, the combination of an oscillating frame, a saw blade carried by the oscillating frame, a guide bar, a rider on the guide bar, a pivot for mounting the oscillating frame on the rider at a point slightly to one side of the cutting center of the saw blade, means for exerting a pressure tending to advance the rider during the active movement of the saw blade, an element provided with ratchet teeth, a dog mounted to engage said ratchet teeth on the inactive movement of the blade and to disengage from said teeth on the active movement of the saw blade, a connection between the dog and the rider for holding the latter against advancement under pressure when the dog is in engagement with the ratchet teeth, and a stop for limiting the extent of the disengaging movement of the dog, substantially as described.

5. In a saw of the class described, the combination of an oscillating frame, a saw blade carried by the oscillating frame, a rider to which the oscillating frame is pivoted, a guide member on which the rider is slidably mounted, means for exerting a pressure to force the rider inwardly along the guide member, an element provided with ratchet teeth, a dog adapted to engage the ratchet teeth, a friction contact member on the dog in frictional engagement with the oscillating frame, and a connection between the dog and the rider, whereby the rider will be held against advancement under pressure when the dog is in engagement with the ratchet teeth during the inactive stroke of the saw, and whereby the dog will be disengaged from engagement during the active stroke of the saw, substantially as described.

6. In a saw of the class described, the combination of an oscillating frame, a saw blade carried by the oscillating frame, a rider to which the oscillating frame is pivoted at a point slightly off center with respect to the cutting blade, a guide member on which the rider is slidably mounted, means for exerting a pressure to force the rider inwardly along the guide member, an element provided with ratchet teeth, a dog adapted to engage the ratchet teeth, a friction contact member on the dog in frictional engagement with the oscillating frame, and a connection between the dog and the rider, whereby the rider will be held against advancement under pressure when the dog is in engagement with the ratchet teeth during the inactive stroke of the saw, and whereby the dog will be disengaged from engagement during the active stroke of the saw, substantially as described.

7. In a saw of the class described, the combination of a pair of oscillating frames symmetrically arranged with respect to a common center, saw blades carried by the oscillating frames, means for clamping the work in the center position, a pair of guides oppositely disposed with respect to the center and in longitudinal alinement with one another, a pair of riders slidably mounted on the respective guides, pivots for mounting the oscillating frames on the respective riders, and means for oscillating the frames in alternation with one another, substantially as described.

8. In a saw of the class described, the combination of a pair of oscillating frames symmetrically arranged with respect to a common center, saw blades carried by the oscillating frames, means for clamping the work in the center position, a pair of guides oppositely disposed with respect to the center and in longitudinal alinement with one another, a pair of riders slidably mounted on the respective guides, pivots for mounting the oscillating frames on the respective riders at points off center with respect to the saw blades, and means for oscillating the frames in alternation with one another, substantially as described.

9. In a saw of the class described, the combination of a pair of oscillating frames symmetrically arranged with respect to a common center, saw blades carried by the oscillating frames, means for clamping the work in the center position, a pair of guides oppositely disposed with respect to the center and in longitudinal alinement with one another, a pair of riders slidably mounted on the respective guides, pivots for mounting the oscillating frames on the respective riders, a pivoted rocker, means for oscillating the pivoted rocker, and connections between the opposite ends of the pivoted rocker and the respective oscillating frames for oscillating the latter in alternation, substantially as described.

10. In a saw of the class described, the combination of a pair of oscillating frames symmetrically arranged with respect to a common center, saw blades carried by the oscillating frames, means for clamping the work in the center position, a pair of guides oppositely disposed with respect to the center and in longitudinal alinement with one another, a pair of riders slidably mounted on the respective guides, pivots for mounting the oscillating frames on the respective riders at points off center with respect to the saw blades, a pivoted rocker, means for oscillating the pivoted rocker, and connections between opposite ends of the pivoted rocker and the respective oscillating frames for oscillating the latter in alternation, substantially as described.

11. In a saw of the class described, the combination of a pair of oscillating frames symmetrically arranged with respect to a common center, saw blades carried by the oscillating frames, means for clamping the work in the center position, a pair of guides oppositely disposed with respect to the center and in longitudinal alinement with one another, a pair of riders slidably mounted on the respective guides, pivots for mounting the oscillating frames on the respective riders, a pivoted rocker, means for oscillating the pivoted rocker, connections between the opposite ends of the pivoted rocker and the respective oscillating frames for oscillating the latter in alternation, a slidably mounted friction wheel connected with the rocker oscillating means, and a driving friction disk in contact with the friction wheel, substantially as described.

12. In a saw of the class described, the combination of a pair of oscillating frames symmetrically arranged with respect to a common center, saw blades carried by the oscillating frames, means for clamping the work in the center position, a pair of guides oppositely disposed with respect to the center and in longitudinal alinement with one another, a pair of riders slidably mounted on the respective guides, pivots for mounting the oscillating frames on the respective riders at points off center with respect to the saw blades, a pivoted rocker, means for oscillating the pivoted rocker, connections between opposite ends of the pivoted rocker and the respective oscillating frames for oscillating the latter in alternation, a slidably mounted friction wheel connected with the rocker oscillating means, and a driving friction disk in contact with the friction wheel, substantially as described.

13. In a saw of the class described, the combination of a pair of oscillating frames, saw blades carried by the oscillating frames, means for clamping the work in the center position, guides in longitudinal alinement with one another on opposite sides of the center position, riders mounted upon the respective guides, pivots for mounting the oscillating frames on the riders, means for exerting an inward pressure on the riders, means for locking the riders against advancement on the inactive return strokes of the saw blades and adapted to release the riders for advancement on the active strokes of the saw blades, and a floating stop member for limiting the approach of the saw blades toward one another, substantially as described.

14. In a saw of the class described, the combination of a pair of oscillating frames, saw blades carried by the oscillating frames, means for clamping the work in the center position, guides in longitudinal alinement with one another on opposite sides of the center position, riders mounted upon the respective guides, pivots for mounting the oscillating frames on the riders, means for exerting an inward pressure on the riders, means for locking the riders against advancement on the inactive return strokes of the saw blades and adapted to release the riders for advancement on the active strokes of the saw blades, and a floating stop member for limiting the approach of the saw blades toward one another, said floating stop member being in the form of a yoke centrally pivoted and provided with stop members adapted to be engaged by the oscillating frames when the limit of approach is reached, substantially as described.

15. In a saw of the class described, the combination of a pair of oscillating frames, saw blades carried by the oscillating frames, means for clamping the work in the center position, guides in longitudinal alinement with one another on opposite sides of the center position, riders mounted upon the respective guides, pivots for mounting the oscillating frames on the riders at points off center with respect to the saw blades, means for exerting an inward pressure on the riders, means for locking the riders against advancement on the inactive return strokes of the saw blades and adapted to release the riders for advancement on the active strokes of the saw blades, and a floating stop member for limiting the approach of the saw blades toward one another, substantially as described.

16. In a saw of the class described, the combination of a pair of oscillating frames, saw blades carried by the oscillating frames, means for clamping the work in the center position, guides in longitudinal alinement with one another on opposite sides of the center position, riders mounted upon the respective guides, pivots for mounting the oscillating frames on the riders at points off center with respect to the saw blades, means for exerting an inward pressure on the riders, means for locking the riders against advancement on the inactive return strokes of the saw blades and adapted to release the riders for advancement on the active strokes of the saw blades, and a floating stop member for limiting the approach of the saw blades toward one another, said floating stop member being in the form of a yoke centrally pivoted and provided with stop members adapted to be engaged by the oscillating frames when the limit of approach is reached, substantially as described.

17. In a saw of the class described, an oscillating frame, a saw blade rigidly carried by the frame in parallelism therewith and having a straight cutting edge, and a mounting to which the oscillating frame is pivoted, substantially as described.

18. In a saw of the class described, an oscillating frame, a saw blade rigidly carried by the frame and having a straight cutting edge, a mounting for the oscillating frame, and means permitting advancement of the frame and blade on the cutting stroke and allowing retraction of the blade from the cut on the return stroke, substantially as described.

19. In a saw of the class described, an oscillating frame, a saw blade rigidly carried by the frame and having a straight cutting edge, a slidable mounting for the oscillating frame, and means designed to permit advancement of the frame and saw blade on the cutting stroke and allowing retraction of the blade on the return stroke, substantially as described.

20. In a saw of the class described, an oscillating saw frame having a straight saw blade rigidly attached thereto, and means for advancing the saw blade and frame on the cutting stroke, substantially as described.

21. In a saw of the class described, the combination of a pair of oscillating frames movable toward and from one another and provided with contact stop surfaces, saw blades carried by the oscillating frames, means for clamping the work in position intermediate the saw blades, means for moving the oscillating frames inwardly toward one another, an intermediate floating member provided with stops adapted to limit the approach of the oscillating frames toward one another, the contact stop surfaces on the oscillating frames being adapted to ride along the stops on the floating member and shaped to cause the active saw to overreach the point of severance of the work to correspondingly force back the inactive saw to prevent contact with the saws against one another on the ultimate cutting stroke, and means for oscillating the frames in alternation, substantially as described.

22. In a saw of the class described, the combination of a pair of oscillating frames movable toward and from one another and provided with contact stop surfaces, saw blades carried by the oscillating frames, means for clamping the work in position intermediate the saw blades, means for moving the oscillating frames inwardly toward one another, an intermediate floating member provided with stops adapted to limit the approach of the oscillating frames toward one another, the contact stop surfaces on the oscillating frames being adapted to ride along the stops on the floating member and shaped to cause the active saw to over-reach the point of severance of the work to correspondingly force back the inactive saw to prevent contact with the saws against one another on the ultimate cutting stroke, means for oscillating the frames in alternation, and means for alternately locking the oscillating frames against advancement on each return stroke, substantially as described.

CLARENCE E. VAN AUKEN.

Copies of this patent may be obtained for five cents each, by addressing the "Commissioner of Patents, Washington, D. C."